US011693960B2

(12) United States Patent
Ben David et al.

(10) Patent No.: US 11,693,960 B2
(45) Date of Patent: *Jul. 4, 2023

(54) SYSTEM AND METHOD FOR DETECTING LEAKED DOCUMENTS ON A COMPUTER NETWORK

(71) Applicant: IntSights Cyber Intelligence Ltd., Herzliya (IL)

(72) Inventors: Gal Ben David, Petah Tikva (IL); Amir Hozez, Ganei Tiqwa (IL); Alon Arvatz, Raanana (IL); Guy Nizan, New York, NY (US); Shmuel Ur, Shorashim (IL)

(73) Assignee: IntSights Cyber Intelligence Ltd., Tel Aviv (IL)

( * ) Notice: Subject to any disclaimer, the term of this patent is extended or adjusted under 35 U.S.C. 154(b) by 168 days.

This patent is subject to a terminal disclaimer.

(21) Appl. No.: 17/323,292

(22) Filed: May 18, 2021

(65) Prior Publication Data

US 2021/0271756 A1 Sep. 2, 2021

Related U.S. Application Data

(63) Continuation of application No. 16/242,018, filed on Jan. 8, 2019, now Pat. No. 11,120,129.

(51) Int. Cl.
*H04L 29/06* (2006.01)
*G06F 21/55* (2013.01)
(Continued)

(52) U.S. Cl.
CPC .......... *G06F 21/556* (2013.01); *G06F 16/148* (2019.01); *G06F 16/953* (2019.01);
(Continued)

(58) Field of Classification Search
CPC .... G06F 21/556; G06F 16/953; G06F 16/148; H04L 63/0263; H04L 63/1441
See application file for complete search history.

(56) References Cited

U.S. PATENT DOCUMENTS 7,043,473 B1 * 5/2006 Rassool ............... G06F 16/683
9,578,048 B1 2/2017 Hunt et al.
(Continued)

OTHER PUBLICATIONS

U.S. Appl. No. 16/242,018, filed Jan. 8, 2019, Ben David et al.

*Primary Examiner* — Shin-Hon (Eric) Chen
(74) *Attorney, Agent, or Firm* — Wolf, Greenfield & Sacks, P.C.

(57) ABSTRACT

A system and a method of obtaining a location of a document on a computer network based on a document property. The method may include: receiving at least one basic marker and an encoding function associated with the document property; generating a search term according to the encoding function, based on the at least one basic marker; providing the search term to at least one search engine and obtaining therefrom one or more search results corresponding, where each search result may include one or more references to locations of documents on the computer network; discovering at least one document having the document property from the one or more search results and obtaining a discovered location of the document on the computer network; and performing at least one rule-based action, according to at least one document property of the discovered document.

21 Claims, 5 Drawing Sheets

(51) Int. Cl.
*H04L 9/40* (2022.01)
*G06F 16/14* (2019.01)
*G06F 16/953* (2019.01)

(52) U.S. Cl.
CPC ...... *H04L 63/0263* (2013.01); *H04L 63/1441* (2013.01); *G06F 2221/2101* (2013.01)

(56) References Cited

U.S. PATENT DOCUMENTS

| | | | | |
|---|---|---|---|---|
| 9,659,014 | B1* | 5/2017 | Walters | G06F 16/7847 |
| 10,305,925 | B2 | 5/2019 | Roytman et al. | |
| 10,505,981 | B2 | 12/2019 | Hunt et al. | |
| 10,778,702 | B1 | 9/2020 | Huang et al. | |
| 10,817,592 | B1* | 10/2020 | Bronson | H04L 63/0236 |
| 11,120,129 | B2 | 9/2021 | Ben David et al. | |
| 2003/0018668 | A1* | 1/2003 | Britton | G06F 40/169 |
| | | | | 715/230 |
| 2003/0037010 | A1* | 2/2003 | Schmelzer | G06Q 20/3674 |
| | | | | 705/67 |
| 2004/0250080 | A1* | 12/2004 | Levy | G06T 1/0064 |
| | | | | 713/176 |
| 2006/0239501 | A1* | 10/2006 | Petrovic | H04N 1/32203 |
| | | | | 380/54 |
| 2007/0180251 | A1* | 8/2007 | Carr | H04N 1/32203 |
| | | | | 713/176 |
| 2010/0278453 | A1‡ | 11/2010 | King | G06F 40/169 |
| | | | | 382/321 |
| 2014/0157441 | A1* | 6/2014 | Georgiev | G06F 21/10 |
| | | | | 726/32 |
| 2015/0154231 | A1* | 6/2015 | Rodriguez | H04N 1/32352 |
| | | | | 382/100 |
| 2015/0186624 | A1* | 7/2015 | Lee | G06F 21/10 |
| | | | | 726/26 |
| 2016/0034977 | A1* | 2/2016 | Bhaowal | H04L 51/046 |
| | | | | 707/722 |
| 2016/0217276 | A1* | 7/2016 | Choi | H04L 63/0428 |
| 2017/0150195 | A1* | 5/2017 | Yu | H04N 21/4383 |
| 2017/0334234 | A1* | 11/2017 | Curtis | B42D 25/333 |
| 2018/0322901 | A1* | 11/2018 | Al Qubaisi | G06F 21/16 |
| 2019/0220671 | A1* | 7/2019 | Slipenchuk | G06F 16/48 |
| 2020/0084335 | A1* | 3/2020 | Guidotti | G06F 21/64 |
| 2020/0218804 | A1 | 7/2020 | Ben David et al. | |

\* cited by examiner
‡ imported from a related application

SYSTEM AND METHOD FOR DETECTING LEAKED DOCUMENTS ON A COMPUTER NETWORK

CROSS-REFERENCE TO RELATED APPLICATIONS

This application is a continuation of U.S. patent application Ser. No. 16/242,018, filed Jan. 8, 2019, entitled: "SYSTEM AND METHOD FOR DETECTING LEAKED DOCUMENTSON A COMPUTER NETWORK" which is hereby incorporated by reference in its entirety.

FIELD OF THE INVENTION

The present invention relates generally to document management. More specifically, the present invention relates to detecting leaked documents on a computer network.

BACKGROUND OF THE INVENTION

Entities such as organizations (e.g., companies, firms, etc.) and individuals put much effort into production of documents and intellectual property (IP) data elements (e.g., text documents, articles, email messages, images, and the like) and are obviously concerned about possible leakage of this data—the documents or IP being copied, transmitted or disseminated outside the organization. These entities would normally be interested in knowing whether their documents have leaked, and whether they appear in places they were not supposed to, such as on specific domains in the internet.

Common practice for discovery of stray organizational proprietary documents may include searching for the organization's name in web domains beyond the organization's domain, using one or more commercially available search engines (e.g., Google, Bing, and the like). The commercially available search engines may produce a search result, which may be manually analyzed to extract data elements of interest (e.g., sensitive documents which may have leaked to third-party internet domains), ascertaining whether a leak has indeed occurred and conclude what the ramifications of such a link may be.

The common practice described above includes multiple disadvantages.

For example, the searched element (e.g., an organization's name) may be commonly used in context other than the organization's IP and documents. The outcome of the search result may consequently include a large number of discovered elements that may be irrelevant (e.g., elements that are not sought after) by a person conducting the search, which may be termed false positives.

In another example, organizational documents may not include the organization's name. Consequently, the outcome of the search result may not be complete.

In another example, organizational documents may be legitimately open to the public (e.g., sales-related material, news items, and the like). Thus, the outcome of search results may not be unique (e.g., may be distributed at a multitude of locations) and may not be of any consequence for the purpose of detecting a leak.

In another example, commercially available search engines normally return a limited number of search results. For example, a search may yield half a million elements, but only the first 1,000 may be delivered or reported to the searching party. The search result may therefore be incomplete.

In another example, having found a relevant document, additional time and manual effort may be required by the person conducting the search in order to analyze and/or act upon the outcome of the search result. This may include for example, extracting organizational documents from the search result, prioritizing the extracted documents, ascertaining whether a leak has occurred, determining the severity of such a leak, ascertaining who are the responsible people (e.g., the owner of a document), ascertain the level of confidentiality, assessing the consequence of the suspected leakage, determining which actions should be taken in view of a suspected leak and invoke a preemptive action to minimize leakage damage according to the acquired data.

The overall outcome of such deficiencies as described above results in a common practice that is both very manual and time consuming and non-exhaustive (e.g., many leaks may remain undetected).

SUMMARY OF THE INVENTION

A system and a method for detection of leaked documents (e.g., documents) from a computer network (e.g., a local area network (LAN), a wide area network (WAN) the internet, etc.), or database that is automated, exhaustive and correlated to properties (e.g., secrecy, ownership, topic, etc.) of each document is desired.

Embodiments of the present invention may include a method of obtaining a location of a document on a computer network based on at least one document property. The method may include: receiving at least one basic marker and at least one encoding function that may be associated with the document property; generating one or more search terms according to the at least one encoding function, based on the at least one basic marker; providing the one or more search terms to at least one search engine; obtaining from the at least one search engine one or more search results, that may correspond to the one or more search terms, where each search result may include one or more references to locations of documents on the computer network; discovering at least one document having the at least one document property from the one or more search results and obtaining a respective discovered location of the document on the computer network; and performing at least one rule-based action, according to at least one document property of the discovered document.

At least one rule-based action may be selected from a list that may include: sending a request message to one or more online host devices associated with the discovered location; sending a warning notification to one or more local host devices; marking the document as compromised on a local document repository; and storing the discovered location on a local document repository for further analysis.

According to some embodiments, discovering at least one document may include: retrieving one or more documents according to respective obtained locations in the search result; and applying a decoding function on one or more retrieved documents to identify the at least one document having the at least one document property.

Embodiments of the method may further include classifying the at least one discovered document according to at least one of: the at least one document property, a data element pertaining to content of the document and an obtained location on the computer network.

According to some embodiments, performing at least one rule-based action may include: selecting at least one rule-based action according to the classification of at least one discovered document; and applying the selected action on a respective network entity.

At least one rule-based action may be selected from a list that may include at least one of: producing a notification message to the network entity and configuring the network entity to restrict transfer of data between network entity and the discovered location.

Embodiments of the present invention may include a method of limiting a number of search results provided by a search engine. The method may include: receiving a group of N1 documents having at least one common document property; generating an encoded marker, uniquely representing the at least one common document property, based on one or more basic markers; providing the encoded marker to a search engine as a search term; and obtaining from the search engine a number N2 of search results, wherein N2 may be limited by the number of copies of documents of the group of N1 documents on the computer network.

Embodiments of the present invention may include a system for obtaining a location of a document on a computer network based on at least one property of the document.

Embodiments of the system may include an encoder module and an auditing module. The encoder module may be configured to mark the document with an encoded marker that may uniquely represent the document property. The auditing module may be configured to search the computer network and obtain the location of the document (e.g., obtain a reference to a location whereat a copy of the marked document may be stored) according to the encoded marker (e.g., by providing the encoded marker as a search term to a search engine).

Encoder module may be configured to receive one or more basic markers; receive an encoding function associated with the document property; produce an encoded marker based on the one or more basic markers according to the encoding function; and mark the document with the encoded marker.

The encoding function may include one or more obfuscation elements that may include, for example, attributing different meaning to different permutations of basic markers and/or selected portions of encoded markers, as explained herein.

Auditing module may be configured to receive one or more basic markers; produce one or more search terms based on the one or more basic markers and according to a decoding function; and utilize a search engine to obtain one or more search results corresponding to the one or more search terms.

The at least one search result may include one or more references (e.g., addresses, pointers, links and the like) to locations of one or more marked documents on the computer network.

Auditing module may be configured to: discover at least one document having the at least one document property from the one or more search results and a respective location on the computer network; and perform at least one rule-based action, according to at least one document property of the discovered document.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
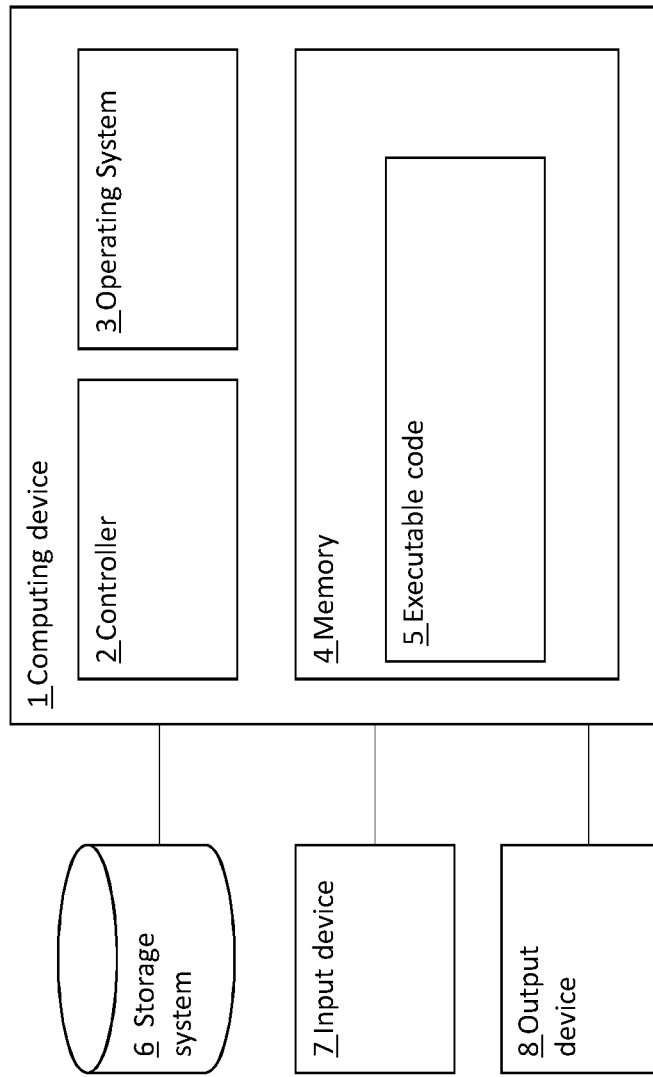
FIG. 1 is a block diagram, depicting a computing device which may be included in a system for detecting leaked documents on a computer network according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose methods and systems for detecting leaked documents on a computer network.

Reference is now made to FIG. 1, which is a block diagram depicting a computing device, which may be included within an embodiment of a system for detecting leaked documents, or documents that are copied or transmitted without permission, from a computer network or database, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 100 may act as the components of, a system according to embodiments of the invention. Various modules or components described herein may be implemented as or by components of FIG. 1.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that may detect leaked documents on a computer network as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 120 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

The following table provides a reference to terms that are used herein.

TABLE 1

| | |
|---|---|
| Document | The term 'document' may be used herein to refer to any type of data element, such as a text document (e.g., a Portable Document Format (PDF) document, a Microsoft office (DOC) document, a plain text (TXT) document and the like), an email message, a spreadsheet, a presentation, a photograph or image, and the like that may be proprietary to a specific individual or organization. Embodiments may include a method of automatically ascertaining whether such a document has leaked to a location on a computer network (e.g. as a publicly accessible document on a server or a website connected to the internet, the internet and its accessible components being one example of a network) that is beyond a predefined permitted domain (e.g., a domain other than the document's proprietor). |
| Leak | The term 'leak' may be used herein to refer to a condition in which a document has been intentionally or unintentionally copied or transferred to a location (e.g., a domain) on a computer network, beyond a predefined permitted location. |
| Original document | The term "original document" may be used herein to refer to a document that is proprietary to a specific individual or organization, at an original form, e.g., prior to being modified or marked by embodiments of the present invention. |

TABLE 1-continued

| | |
|---|---|
| Document properties | The term 'properties' or "document properties" may be used herein to refer to at least one characteristic of a document, including for example: a subject of the document, a title of the document, the document's owner (e.g., a person who may have wrote the document), the document pertinence (e.g., association of the document) to a department of an organization, such as sales and R&D departments, a level of secrecy associated with the document and the like. |
| Marker | The term 'marker' may be used herein to refer to any data element (e.g., a character string, an image, a watermark and the like) that may be attached to or included in an original document, to produce a marked document, indicating one or more of the document's properties. |
| Marked document | The term "marked document" may be used herein to refer to a document that may include or may be associated with a marker, indicating one or more of the document's properties (e.g., document ownership). |
| Basic marker(s) | The term "basic marker(s)" may be used herein to refer to a basic type of marker (e.g., a first character string, "S1" and a second character string, "S2") that may be used by some embodiments of the invention as a building block to produce one or more higher-level markers. |
| Encoded marker | The term "encoded marker" may be used herein to refer to a high-level type of marker that may include or combine one or more basic markers and may correspond to or represent one or more document properties. Pertaining to the above example, a first encoded marker may be a concatenation of strings S1 and S2 (e.g., "S1S2"), and may be pertinent to a first department of an organization, and a second encoded marker may be a duplication of S1 (e.g., "S1S1"), and may be pertinent to a second department of the organization. |
| Encoding function | The term "encoding function" may be used herein to refer to a function that may associate at least one document property with a combination or formation of one or more basic markers to produce an encoded marker. Pertaining to the above example, an encoding function may be the association of a document's pertinence to the first department of the organization with concatenation of strings S1 and S2 (e.g., to form encoded marker "S1S2"). |
| Decoding function | In a complementary manner, the term "decoding function" may be used herein to refer to a function that may associate an encoded marker with at least one document property. Pertaining to the above example, a decoding function may be the association of an encoded marker "S1S2" with the document's pertinence to the first department. |

Figure 2:
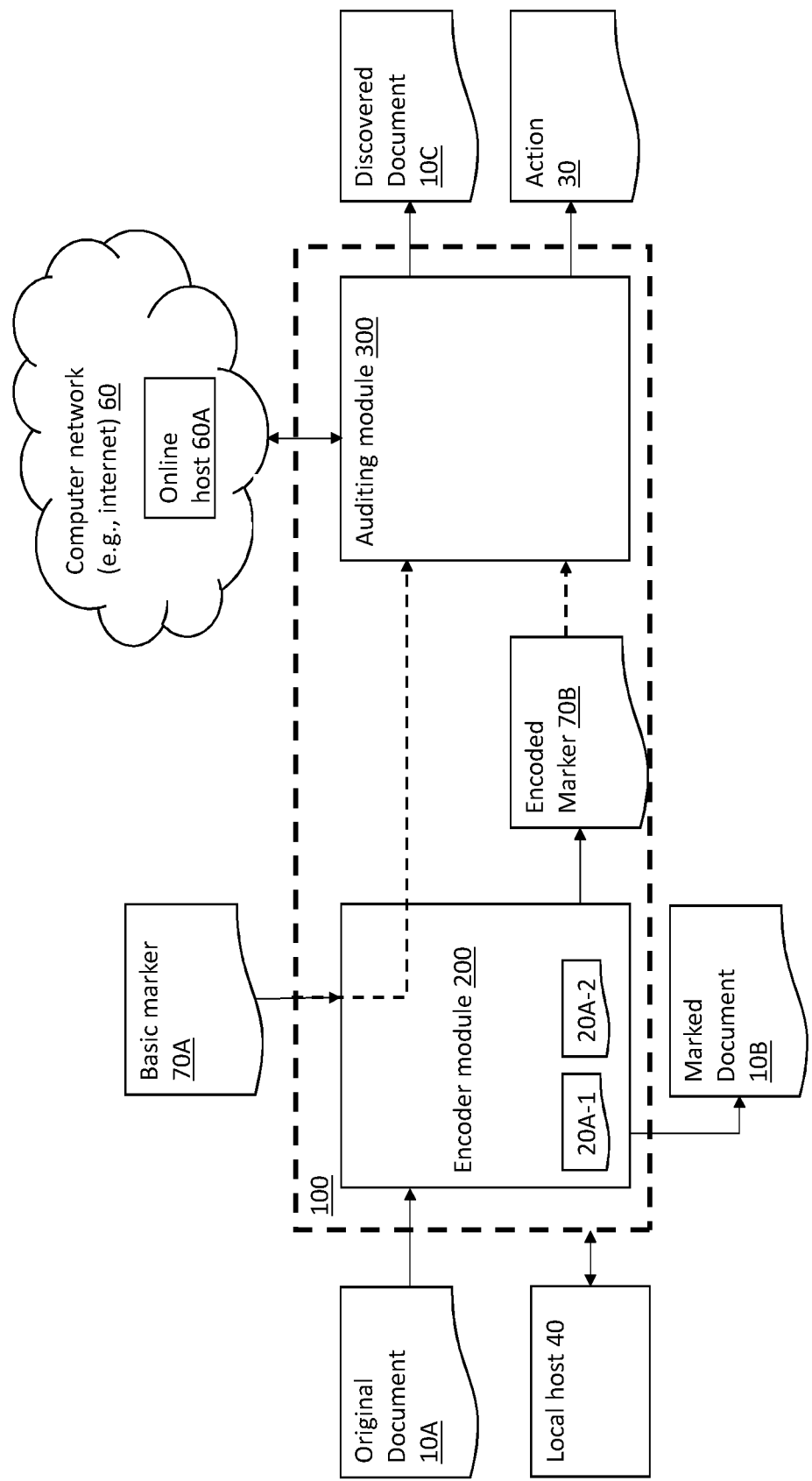
FIG. 2 is a block diagram, depicting a system for detecting leaked documents on a computer network according to some embodiments.

Reference is now made to FIG. 2, which depicts an overview of a system 100 for detecting or discovering leaked documents (e.g., text documents, emails, notes, messages, images, video files etc.) and/or obtaining or determining a location of a discovered document on a computer network (e.g., a "discovered location"), based on at least one property of the document, as elaborated herein. The computer network may be for example the internet and the documents discoverable or searchable on the internet, which may be for example stored on servers or websites connected to the internet. Other computer networks may be used.

As shown in FIG. 2, system 100 may include at least one encoder module 200 and at least one auditing module 300. Encoder module 200 may be configured to mark or augment an original document 10A with an encoded marker 70B that is associated with a document property of the original document 10A according to an encoding function. Auditing module 300 may be configured to search the computer network and obtain or determine the discovered location (e.g., a reference, pointer, address and the like of a storage location) of the marked document (e.g., a location of a copy of the marked document on the computer network) according to the encoded marker 70B (e.g., by utilizing the encoded marker as a search term by a search engine, as explained herein). As FIG. 2 depicts an overview of system 100, an elaborated explanation of the functionality of encoder module 200 and auditing module 300 is provided herein, in relation to the respective figures.

According to some embodiments, at least one of encoder module 200 and auditing module 300 may include or may be associated with a computing device (e.g., element 1 of FIG. 1), and may be configured to perform the functions of the encoder module 200 and auditing module 300 respectively, as described herein.

Encoder module 200 and auditing module 300 may be implemented as hardware modules, software modules or any combination thereof. For example, encoder module 200 and auditing module 300 may be implemented by one or more software processes, and may be executed by a processor (e.g., element 2 of FIG. 1) of a computing device (e.g., element 1 of FIG. 1).

In some embodiments, encoder module 200 and auditing module 300 may be implemented separately (e.g., on separate computing devices 1 or computing device 1 instantiations). Alternately, encoder module 200 and auditing module 300 may be implemented on the same computing device 1.

Encoder module 200 may receive (e.g., via input device 7 of FIG. 1) an original document (e.g., a text document) 10A and one or more basic markers 70A.

According to some embodiments, the one or more basic markers 70A may be or may include any type of data element that may be searchable by a commercially available search engine. For example: at least one basic marker 70A may be a character string, including one or more American Standard Code for Information Interchange (ASCII) characters; at least one basic marker 70A may be an image data element in any known format, such as a bit-map (BMP) file, a Joint Photographic Experts Group (JPEG) file and the like.

Encoder module 200 may further receive at least one data element 20A-1 associated with a property of original document 10A, including for example, the document's owner (e.g., a person who may have wrote the document), the document pertinence (e.g., association of the document to a department of an organization, such as sales and R&D departments), a level of secrecy associated with the document and the like. Encoder module 200 may receive the document property data 20A-1 as part of the document (e.g., as metadata adjoint with the document as known in the art) or separately from the original document 10A (e.g., via input device 7 of FIG. 1).

Encoder module 200 may apply an encoding function 20A-2 on the one or more basic markers 70A as elaborated herein, to produce an encoded marker 70B that may be associated with the one or more document property.

For example, one or more basic markers may be or may include an image (e.g., an icon) that may be searchable by a commercially available search engine. An encoding function (e.g., 20A-2) may associate a first document property (e.g., document owned by user U1) with a first encoded marker 70B, such as a first combination and/or concatenation of one or more basic markers (e.g., the one or more icons) and a second document property (e.g., a document pertaining to a specific project) with a second encoded marker 70B, such as a second combination and/or concatenation of one or more basic markers (e.g., the one or more icons).

In another example, a basic marker may be an image (e.g., an icon) including three color channels, such as red green and blue (RGB). An encoding function (e.g., 20A-2) may associate a first document property (e.g., document owned by user U1) with a first encoded marker 70B (e.g., present basic marker in the red channel only) and a second document property (e.g., document owned by user U2) with a second encoded marker 70B (e.g., present basic marker in the blue channel only).

In another example, at least one basic marker may be a character string that may be searchable by a commercially available search engine. For example, a first basic marker may be a first character string (e.g., S1) and a second basic marker may be a second character string (e.g., S2). An encoding function (e.g., 20A-2) may: associate a first document property (e.g., a low level of secrecy) with one or more first encoded markers 70B that may be one or more first combinations of the basic markers (e.g., "S1S1"); associate a second document property (e.g., a medium level of secrecy) with one or more second encoded markers 70B that may be one or more second combinations of the basic markers (e.g., "S1 S2", "S2 S1"); and associate a third document property (e.g., high level of secrecy) with one or more third encoded markers 70B that may be one or more third combinations of the basic markers (e.g., "S2 S2").

Encoding function 20A-2 may be adapted to produce encoded markers 70B that uniquely represent at least one document property, based on the one or more basic markers. The encoded marker 70B may uniquely represent one or more document property in a sense that the encoded marker may be unlikely to be reproduced in a context other than marking a document 10B by encoder module 200. In other words, the probability of discovering (e.g., on the internet, by utilizing a search engine) the encoded markers 70B in the context of a search for a marked document 10B on computer network 60 may be substantially higher than the probability of discovering the encoded marker 70B in a context that excludes the searched document. For example, assuming encoded marker 70B is a long and complex character string that may be incomprehensible to a human reader. The probability of finding or discovering, (e.g., on the internet, by utilizing a search engine) a marked document 10B that had been marked by the complex encoded marker 70B (e.g., to uniquely represent a specific document property), and had been leaked to the internet, may be substantially higher than the probability of discovering a second document that may include the same complex encoded marker 70B, where the second document may be unrelated to the searched document 10B.

It may be noted that one or more encoded markers 70B may uniquely represent a single document property and/or any combination of document properties, as dictated by encoding function 20A-2, and as explained herein in relation to table 3.

Encoder module 200 may mark or modify original document (e.g., a textual document) 10A with encoded marker 70B, to produce a marked document (e.g., a marked textual document) 10B. Encoded marker 70B may be associated with a predefined document property of document 10A by the encoding function.

For example, document 10A may be a text file (e.g., a DOC file). Encoder module 200 may be configured to add or concatenate encoded marker 70B (e.g., character string "S1 S2") to original document 10A (e.g., the textual document), to create a marked document 10B that is associated with a predefined document property (e.g., high level of secrecy) of original document 10A.

In another example, document 10A may be a text file, and encoder module 200 may add or concatenate an encoded marker 70B that is an image (e.g., a .JPG image, a bitmap image, and the like) in the content of 10A to create a marked document 10B that is associated with a predefined document property (e.g., pertinence to a specific work-group) of original document 10A.

Encoder module 200 may add or concatenate encoded marker 70B into the content of original document 10A in one or more of a variety of options, including for example: as part of a cover page of document 10A, as part of a header of document 10A, as a line in the end of document 10A, as a line in the beginning of document 10A, and the like.

According to some embodiments, Encoder module 200 may add or concatenate encoded marker 70B as part of a metadata of document 10A, including for example: as part of a file name, as part of a file description and the like.

In some embodiments, marked document 10B (e.g., a PDF file) may be used and/or stored by the organization, and may have the same specific data structure (e.g., a PDF file data structure) as original document 10A as known in the art, where encoded marker 70B may be included in the data structure of 10B (e.g., within the document's body, within the document's metadata, etc.).

Additionally, or alternately, marked document 10B may be used and/or stored by the organization, and may have a different data structure from the original document 10A. For example, marked document 10B may have an additional metadata field and encoded marker 70B may be included in the additional metadata field.

When needed, leaked copies of the marked document may be obtained using the auditing module 300 as explained herein.

Auditing module 300 may include or may be associated with at least one network interface controller (NIC) and may be configured to interface a computer network 60, including for example, a Local Area Network (LAN) a wide area network (WAN), the internet and the like.

Auditing module 300 may receive at least one of basic marker 70A and encoded marker 70B, and may be configured to search, as elaborated herein, the computer network (e.g., the internet) 60 and obtain or determine a location of discovery of a copy (e.g., discovered document 10C) of marked document 10B on computer network 60 according to encoded marker 70B. The discovered location may be a location of storage on an online host computer 60A, server and/or database, a location of storage within a domain of computer network 60, and the like. The discovered location may be addressable via an internet protocol (IP) address and/or via a domain name and/or host name, as known in the art, and may be represented, for example by a Uniform Resource Locator (URL) line, as known in the art.

According to some embodiments, auditing module 300 may be further configured to perform at least one preemptive and/or corrective action 30, based on the obtained location of discovered document 10C.

For example, auditing module 300 may generate one or more warning notifications (e.g., send one or more email message) regarding discovery and/or retrieval of a copy of marked document 10B at an unauthorized location, to one or more local host computer 40 (e.g., a computing device such as element 1 of FIG. 1, belonging to an analyst or administrative user) that may be associated with or may be communicatively connected to system 100.

In another example, auditing module 300 may generate and/or send one or more request messages to one or more online host devices 60A that may be associated with the discovered location (e.g., a computer where a copy of marked document 10B has been found or discovered). The one or more request messages may include, for example, a notification regarding an infringement of intellectual property rights, and a request to delete the discovered copy.

In another example, auditing module 300 may mark or attribute document 10B (of which a copy has been discovered) as compromised on a local document repository 20B, for further analysis (e.g., damage analysis).

In another example, auditing module 300 may store the discovered location (e.g., a location of storage on an online host computer 60A, a location of storage within a domain of computer network 60) of the copy of marked document 10B on a local document repository for further analysis and actions (e.g., to block data traffic to and/or from the discovered location).

Figure 3:
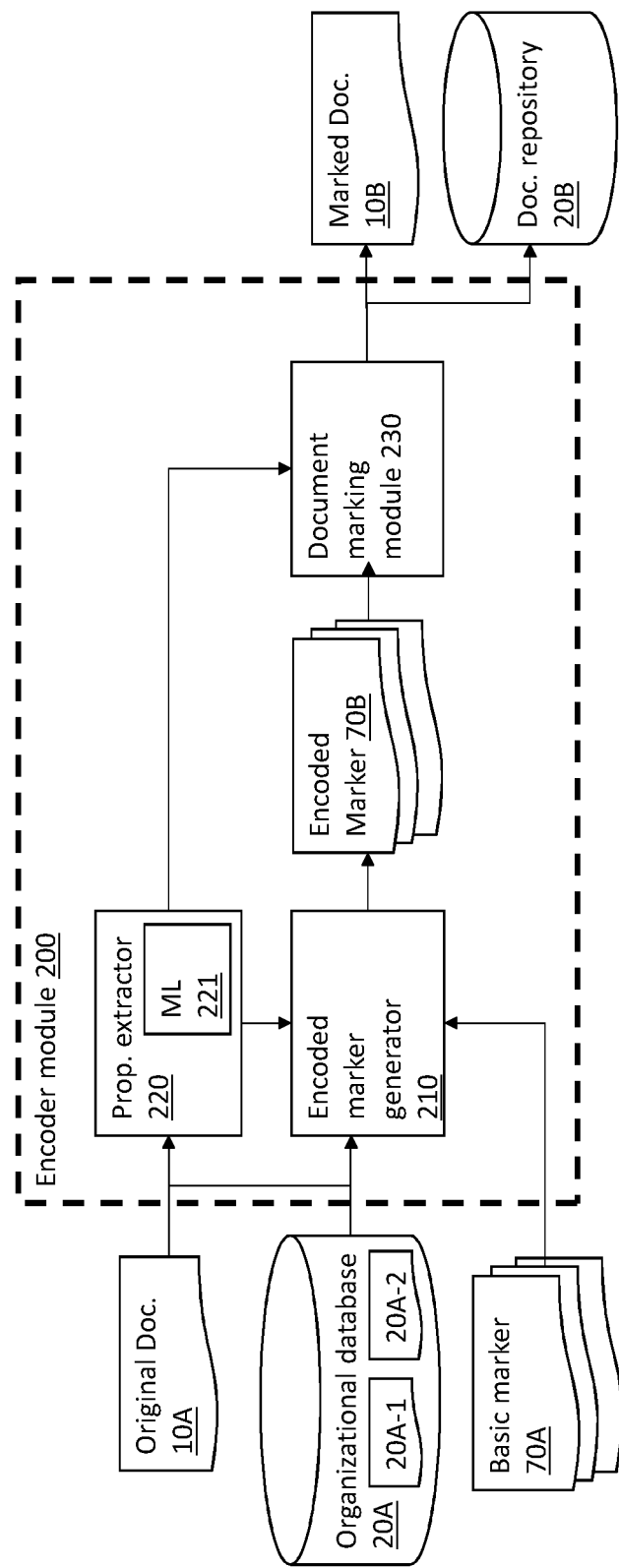
FIG. 3 is a block diagram, depicting an encoder module, which may be included in a system for detecting leaked documents on a computer network according to some embodiments.

Reference is now made to FIG. 3, which is a block diagram, depicting an encoder module, which may be included in a system for detecting leaked documents on a computer network according to some embodiments. Encoder 200 may receive at least one original document 10A and produce marked document 10B as elaborated herein.

According to some embodiments, encoder module 200 (e.g., implemented on a processor) may include or may be associated with an organizational database 20A, that may include at least one element of document property information associated with original document 10A. For example: organizational database 20A may store a name of a person (e.g., an owner, an author, a co-author) associated with original document 10A. organizational database 20A may store information pertaining to the document pertinence, including for example: an association of the document to a department of an organization (e.g., sales, human resources, marketing and R&D departments), to a specific project, a specific event, etc. organizational database 20A may store a level of secrecy and/or severity associated with the document and the like.

Encoder 200 may include a property extraction module 220, configured to interface with organizational database 20A, to obtain at least one document property 20A-1 associated with original document 10A.

For example, property extraction module 220 may receive (e.g., from a metadata associated with original document 10A) an identification of an employee in an organization (e.g., a name or a serial number, an owner of original document 10A). Property extraction module 220 may consequently obtain from organizational database 20A at least one document property 20A-1 according to the received identification, including for example a group or department to which the identified employee is a member of, a project the employee is associated with, and the like.

Alternately, or additionally, property extraction module 220 may extract the at least one element of document property information from the original document. For example, property extraction module 220 may include a machine-learning (ML) module 221, such as a natural language processing (NLP) module, or any other artificial intelligence (AI) based implementation, adapted to extract contextual information from original document 10A (e.g., a topic, a subject, a project, one or more involved people, etc.) to obtain the at least one element of document property information. Encoder 200 may include an encoded marker generator module 210, configured to obtain (e.g., from organizational database 20A, from input device 7 of FIG. 1, and the like) one or more basic markers (e.g., 70A of FIG. 2) and an encoding function 20A-2, and produce an encoded marker 70B from the one or more basic markers 70A according to encoding function 20A-2, as elaborated herein.

Organizational database 20A may store one or more basic markers 70A (e.g., a first character string, an image and the like) that may be used by embodiments of the invention as a building block to produce encoded markers 70B. Organizational database 20A may also store (e.g., as a table in the database, or as another data structure) an encoding function 20A-2 that may associate at least one document property 20A-1 with a combination or formation of one or more basic markers to produce the encoded marker 70B.

For example, assuming basic markers 70A are implemented as strings (e.g., S1, S2, S3, etc.), encoding function 20A-2 may be implemented as a table or other data structure associating or linking at least one document property 20A-1 (or combination thereof) and a respective encoded marker 70B such as in the example provided by table 2, below:

TABLE 2

| Document property 20A-1 | Encoded marker 70B |
| --- | --- |
| Author = User U1, Department = D1 | "S1 S1" |
| Author = User U2, Department = D1 | "S1 S2" |
| Author = User U1, Department = D2 | "S2 S1" |
| Author = User U2, Department = D2 | "S2 S2" |

Pertaining to the example of Table 2, encoded marker generator module 210 may be configured to produce at least one encoded marker 70B from the one or more basic markers 70A (e.g., S1, S2) and the at least one received document property (e.g., document author, pertinent department, etc. or combination thereof) according to the encoding function 20A-2, as elaborated in table 2.

In some embodiments, a user may be interested in obfuscating their actions in view of a third party (e.g., a search engine), so as to prevent the third party from analyzing a purpose or target of an online search. For example, a user may not want the third party to identify a repetitive effort to search for documents that have specific properties (e.g., documents pertaining to a specific, secret project). Accordingly, encoding function 20A-2 may include an obfuscation element, to "cover the tracks" of a such search effort, as in the example brought below, in table 3:

TABLE 3

| Document property 20A-1 | Encoded marker 70B |
|---|---|
| Author = User U1, Department = D1 | "S1 S1 S2 S1", "S3 S1 S3 S1" |
| Author = User U2, Department = D1 | "S1 S1 S2 S2", "S5 S1 S4 S2" |
| Author = User U1, Department = D2 | "S1 S2 S2 S1", "S5 S2 S4 S1" |
| Author = User U2, Department = D2 | "S2 S2 S2 S2", "S5 S2 S2 S2" |

As shown in the example of table 3, encoding function may implement obfuscation of a third party by attributing different meaning to different permutations of basic markers and/or selected portions of encoded markers 70B. In this example, encoded markers 70B may include four basic markers 70A, but encoding function 20A-2 may secretly only relate to two basic markers 70A thereof (e.g., only the second and fourth basic markers 70A of each encoded marker 70B) as shown by the underlined font. For example, encoding function 20A-2 may refer to encoded markers 70B of the first entry (e.g., "S1 S1 S2 S1" and "S3 S1 S3 S1") as both associated with the first document property 20A-1 (e.g., Author=User U1, Department=D1), but a third-party entity (e.g., a search engine) may not have this information.

Encoded marker generator module 210 may randomly select one encoded marker 70B of a plurality of encoded markers 70B (e.g., "S1 S1 S2 S1", "S3 S1 S3 S1") pertaining to a specific document property entry 20A-1 (e.g., author, department or combination thereof). The association of one or more encoded markers 70B with one or more document properties 20A-1 may be obfuscated by the random selection in view of a third-party entity. For example, the third-party entity may erroneously determine that encoded markers 70B "S1 S1 S2 S1" (associated with the first document property 20A-1 entry) and "S1 S1 S2 S2" (associated with the second document property 20A-1 entry) relate to different search operations of documents pertaining to the same category (e.g., of the same document property 20A-1).

Pertaining to the example of Table 3, encoded marker generator module 210 may be configured to produce at least one encoded marker 70B from the one or more basic markers 70A (e.g., S1, S2, etc.) and the at least one received document property (e.g., document author, pertinent department, etc. or combination thereof) according to the encoding function 20A-2 and the obfuscation element, as elaborated in table 3.

As explained above, one or more encoded markers 70B may uniquely represent one or more document properties or combinations thereof, in a sense that the probability of discovering (e.g., on the internet, by utilizing a search engine) the encoded markers 70B in the context of a search for a marked document 10B on computer network 60 may be substantially higher than the probability of discovering the encoded marker 70B in a context that excludes the searched document.

For example, assume that encoded markers 70B (e.g., "S1 S1 S2 S1", "S3 S1 S3 S1") are long and complex character strings that may be incomprehensible to a human reader. The probability of finding or discovering, (e.g., on the internet, by utilizing a search engine) a marked document 10B that had been marked by any of the complex encoded markers and had been leaked to the internet, may be substantially higher than the probability of discovering a second document that may include any one of the same complex encoded markers 70B (e.g., "S1 S1 S2 S1", "S3 S1 S3 S1"), where the second document may be unrelated to the searched document 10B.

As shown in FIG. 3, encoder module 200 may include a document marking module 230, configured to apply or add the encoded marker 70B to the original document 10A so as to produce a marked document 10B. For example, original document 10A may be a text document, and document marking module may be configured to: add encoded marker 70B to the text document (e.g., by concatenating the encoded marker 70B at the beginning and/or end of the text); add encoded marker 70B to metadata associated with the text document, such as the document name, etc.

In some embodiments, document marking module 230 may store (e.g., on a document repository database 20B) the marked version 10B of the original document 10A. According to some embodiments, document repository database 20B may be implemented on the same storage device as organizational database 20A.

Figure 4:
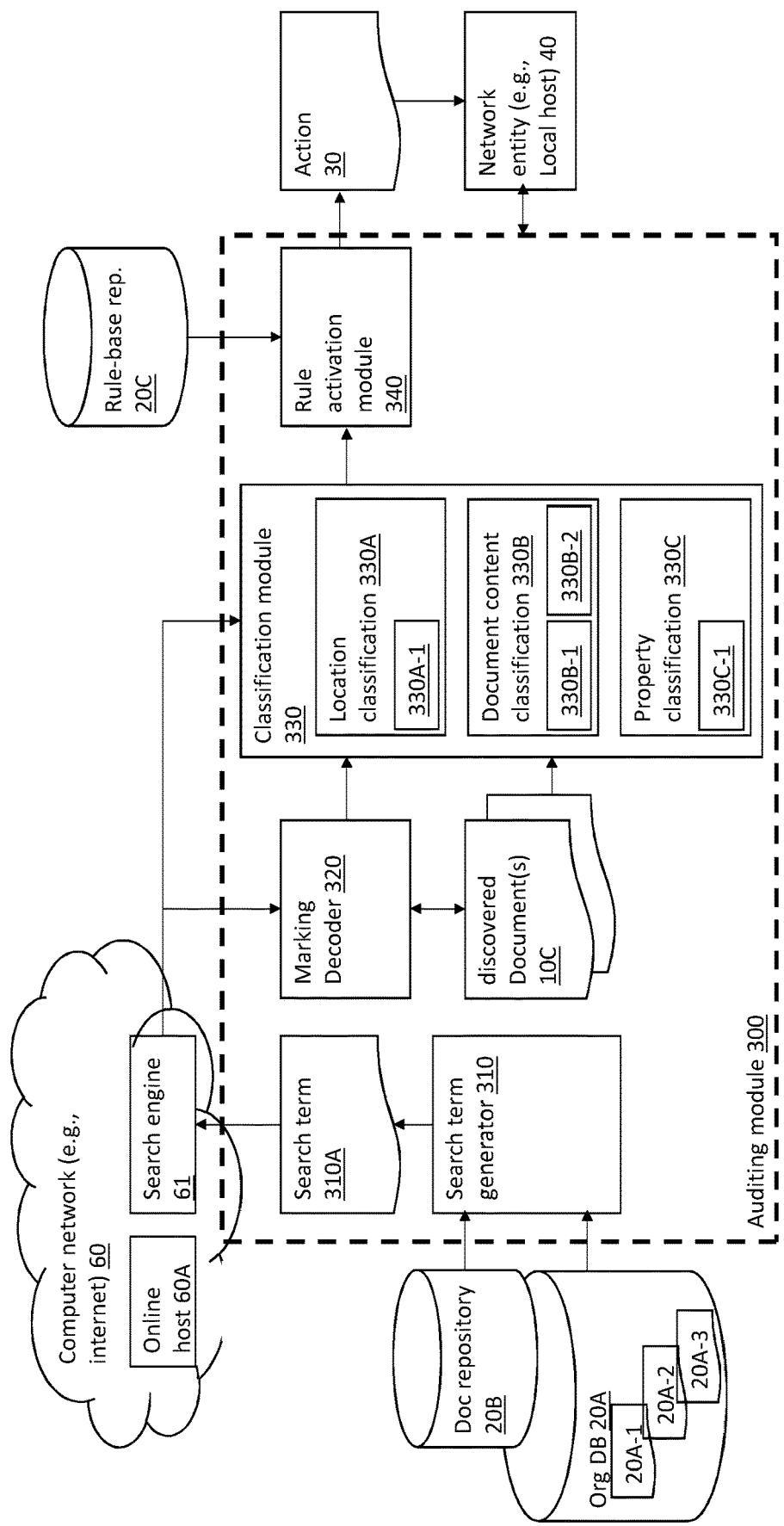
FIG. 4 is a block diagram, depicting an auditing module, which may be included in a system for detecting leaked documents on a computer network according to some embodiments.

Reference is now made to FIG. 4, which is a block diagram of components including an auditing module 300, which may be included in a system for detecting leaked documents on a computer network according to some embodiments. As elaborated herein, auditing module 300 may be adapted to ascertain whether a marked document has been leaked beyond a predefined permitted domain on a computer network and in some embodiments perform one or more actions accordingly.

Auditing module 300 may receive, from at least one user (e.g., via local host 40, via input device 7 of FIG. 1, and the like): at least one definition of a permitted domain; and a request to find one or more locations of storage of a marked document 10B on a computer network 60.

Auditing module 300 may utilize a search engine 61 to conduct a search for a copy of marked document 10B, on computer network 60, beyond the at least one predefined permitted domain name.

In other words, auditing module 300 may receive a predefined, permitted domain or subdomain name (e.g., "my_company.com"), and may conduct a search (e.g., by utilizing a search engine 61) to obtain one or more search results, based on one or more search terms. The one or more search terms may, as explained herein, include one or more encoded markers that may correspond to one or more document properties. The one or more search results may include one or more references (e.g., addresses, links, pointers, etc.) to locations of respective one or more copies of marked documents 10B on computer network 60, including for example, location of storage on an online host computer 60A, location of storage within a domain of computer network 60 and the like.

Auditing module 300 may ascertain, based on one or more search results, whether or not a marked document 10B, having specific document properties (e.g., owned by a specific user U1) has been leaked to a domain (e.g., "other_company.com") on computer network 60 (e.g., the internet) beyond the predefined permitted domain or subdomain (e.g., "my_company.com").

According to some embodiments, auditing module 300 may include a search term generator 310, configured to receive (e.g., from organizational database 20A, from input device 7 of FIG. 1, and the like) at least one of a basic marker 20A-1 (e.g., 'S1', 'S2", etc.) and an encoding function 20A-2 (e.g., as implemented by table 2, above) associated with one or more document properties or combination thereof (e.g., author, pertinent department, ate).

Search term generator 310 may create or generate one or more search terms 310A from or based on the at least one basic marker 20A-1, according to the at least one encoding function. Pertaining to the example of table 2 above, a user may input a requirement (e.g., via a user interface (UI) included in input 7 of FIG. 1) to find one or more documents having at least one specific document property or a combination of properties (e.g., Author=User U1, Department=D1). Search term generator 310 may consequently generate an appropriate search term 310A (e.g., "S1 S1"), that may include or may be equivalent to a corresponding encoded marker 70B (e.g., "S1 S1"). The encoded marker 70B may be based on (e.g., may include) one or more basic marker 20A-1 (e.g., 'S1'). The encoded marker 70B may be created according to the encoding function, as explained herein (e.g., as presented by table 2, where the required document property of Author=User U1 and Department=D1 is associated with encoded marker "S1 S1").

In another example, search term generator 310 may generate a plurality of search terms 310A. For example, search term generator 310 may generate search terms that may be equivalent to all basic markers 20A-1 (e.g., "S1", "S2", "S3", "S4", "S5").

Search term generator 310 may provide the one or more search terms 310A to at least one search engine 61. For example, the search engine may be any type of commercially available online software tool (e.g., Google, Bing, etc.), configured to obtain at least one location (e.g., a location of storage) of a copy of a marked document 10B on a computer network (e.g., on the internet) 60, based on a provided search term, as known in the art.

Auditing module 300 may obtain from search engine 61 one or more search results corresponding to the one or more provided search terms 310A. At least one search result may include one or more references (e.g., an address such as an IP address, a domain name, a host name, a pointer, a link, and the like) to respective one or more locations of documents on computer network 60. The term location may refer herein to a location of computer memory or storage that may be addressable, for example, via an IP address and/or via a domain name and/or via a host name, as known in the art, and may be represented, for example, by a URL line, as known in the art.

Pertaining to the example of search term 310A "S1 S1" above, search engine 61 may produce a search result that may include a list of one or more instantiations of storage of marked document 10B, having corresponding document properties 20A-1 (e.g., Author=User U1, Department=D1) within domains of the internet.

According to some embodiments, auditing module 300 may include a marking decoder module 320, configured to identify at least one document having at least one document property from the one or more search results, based on a decoding function, as elaborated herein.

As known in the art, decoding function 20A-3 may be a complementary, mirror-image of encoding function 20A-2. For example, as encoding function 20A-2 may associate a document property with one or more encoded markers 70B, decoding function 20A-3 may perform the opposite, and associate at least one encoded marker 70B with a respective at least one document property 20A-1 or combination thereof.

Pertaining to the encoding function presented by the example of table 3, a respective decoding function may be implemented as a table or other data structure associating or linking encoded markers 70B and respective document properties, as elaborated by the example of table 4, below:

TABLE 4

| Encoded marker 70B | Document property 20A-1 |
|---|---|
| "S1 <u>S1</u> S2 <u>S1</u>" | Author = User U1, Department = D1 |
| "S3 <u>S1</u> S3 <u>S1</u>" | Author = User U1, Department = D1 |
| "S1 <u>S1</u> S2 <u>S2</u>" | Author = User U2, Department = D1 |
| "S5 <u>S1</u> S4 <u>S2</u>" | Author = User U2, Department = D1 |
| "S1 <u>S2</u> S2 <u>S1</u>" | Author = User U1, Department = D2 |
| "S5 <u>S2</u> S4 <u>S1</u>" | Author = User U1, Department = D2 |
| "S2 <u>S2</u> S2 <u>S2</u>" | Author = User U2, Department = D2 |
| "S5 <u>S2</u> S2 <u>S2</u>" | Author = User U2, Department = D2 |

According to some embodiments, search term generator 310 may generate a plurality of search terms 310A, that may be equivalent to all basic markers 20A-1 (e.g., "S1", "S2", "S3", "S4"), and search engine 61 may produce a respective plurality of search results, including the location of all marked documents having respective markers. As elaborated above, a user may input a requirement to find one or more documents having at least one document property or a combination of properties (e.g., Author=User U1, Department=D1). Marking decoder module 320 may retrieve (e.g., download and/or save on a storage device, such as organizational database 20A) documents according to the respective obtained one or more locations as per the one or more of search results.

Marking decoder module 320 may apply the decoding function on one or more of the retrieved documents to identify one or more discovered documents 10C, that may have or contain the document property or combination of document properties (e.g., Author=User U1, Department=D1). For example, marking decoder module 320 may identify or discover at least one document 10C that is a copy of a marked document 10B, and has an encoded marker (e.g., "S1 S S2 S1" and "S3 S1 S3 S1") that corresponds with the document property or combination of document properties (e.g., Author=User U1, Department=D1).

According to some embodiments marking decoder 320 may obtain (e.g., from the search result) a location (e.g., a domain name) of storage of each discovered document 10C on the computer network for further analysis, as elaborated herein.

According to some embodiments auditing module 300 may include a classification module 330, configured to classify one or more discovered documents 10C to classes or groups, according to one or more categories. In some embodiments, classification module 330 may include one or more classifier modules (e.g., 330A, 330B and 330C), each adapted to classify one or more discovered documents 10C according to a respective class or category, as elaborated herein.

In some embodiments, classification module 330 may include a location classifier 330A, adapted to classify discovered documents 10C based on a discovered location (e.g., a network domain of computer network 60, an online host computer 60A where the document was found or discovered, and the like) according to the search engine's search result.

For example, location classifier 330A may be implemented as a rule-based classifier, where at least location (e.g., a domain and/or subdomain on computer network 60) may be attributed or labeled as pertaining to one or more location classes.

In another example, location classifier 330A may include a machine-learning (ML) based classifier model 330A-1. Model 330A-1 may receive at least one storage location (e.g., domain where the document was found) and a list including at least one permitted domain name (e.g., one or more domains that have been defined by a user as permissible for storing copies of marked documents 10B). Model 330A-1 may be trained (e.g., by any appropriate method of supervised training known in the art), according to the received data, to identify at least one discovered document 10C that has been stored in a location beyond the permitted domains (e.g., a discovered location), and classify the discovered location according to one or more classes of classifier model 330A-1.

The location classes may include, for example: competitor domains, dark-web domains, domains that may have been identified (e.g., by a network security service) as malicious, locations where information is sold, domains associated with government and/or tax authorities, a neutral location (e.g., none of the above classes), etc.

Location classification module 330A may produce a weighted level of severity, pertaining to the location of the discovered document 10C. For example, a first condition of a document 10C that may have been discovered in a domain belonging to a competing organization may indicate a more severe leakage than a second condition of a document 10C that may have been discovered in a permitted domain or sub domain of a business partner.

According to some embodiments, classification module 330 may include a document content classifier 330B, adapted to classify discovered documents 10C based on at least one category pertaining to content of discovered documents 10C.

For example, content classifier 330B may include a natural language processing (NLP) model 330B-1, adapted to analyze a discovered document 10C and identify at least one data element associated with a context or subject that is included within discovered document 10C, as known in the art. For example, NLP model 330B-1 may be adapted to identify a subject, such as a project that may be discussed within a text document. The outcome of the NLP model's 330B-1 analysis may be classified or clustered by any type of clustering model 330B-2 known in the art (e.g., a non-supervised clustering model), to form groups or clusters of discovered documents 10C according to the analysis of NLP model 330B-1.

According to some embodiments, classification module 330 may include a property classification module 330C, adapted to: obtain at least one encoded marker from one or more discovered documents 10C; obtain, based on decoding function 20A-3 (e.g., as in the example of Table 4), at least one document property (e.g., an owner of the document, pertinence of the document to a department and/or a project, a level of secrecy, etc.) pertaining to the respective one or more discovered documents 10C; and classify the one or more discovered documents 10C based on the one or more obtained document properties.

Classification module 330C may include, for example at least one ML-based classifier model 330C-1. Model 330C-1 may receive the one or more obtained document properties and respective discovered document 10C and may be trained (e.g., by any appropriate method of supervised or unsupervised training known in the art), to classify the discovered document 10C according to the obtained document properties.

As explained herein, auditing module 300 may be configured to discover at least one document having at least one document property and a respective location on the computer network, and perform at least one rule-based action, according to the at least one document property.

According to some embodiments, auditing module 300 may include a rule activation module 340, configured to perform at least one rule-based action 30, based on at least one of: a property of the discovered document 10C, a data element that is included within the content of the discovered document 10C, and the location of the discovered document 10C.

Rule activation module 340 may select at least one rule-based action according to the classification of at least one discovered document and may apply the selected action on a respective network entity. In some embodiments, the rule-based action 30 may be a function of discovered document 10C with each cluster and/or class of classification model 330.

For example, rule activation module 340 may include a table, associating at least one action or a combination of actions (e.g., producing a notification warning to an administrator, blocking sending or uploading of documents, etc.) with a membership or a combination of memberships of a discovered document 10C in one of: a group of discovered documents 10C in classifier model 330A-1; a group of discovered documents 10C in clustering model 330B-2; and a group of discovered documents 10C in classifier model 330C-1, as presented in the example of Table 5, below:

TABLE 5

| Membership in 330-A1 | Membership in 330-B2 | Membership in 330-C1 | Actions |
|---|---|---|---|
| G-A1 | G-B1 | G-C1 | A1, A2 |
| G-A2 | G-B1 | G-C2 | A1, A3 |
| G-A2 | G-B2 | G-C2 | A2, A3 |

As shown in table 5, rule activation module 340 may identify a discovered document 10C that is a member of: a first group (e.g., G-A1) of classification model 330-A1, a second group (e.g., G-B1) of clustering model 330-B2 and a third group (e.g., G-C1) of classification model 330-C1. Rule activation module 340 may consequently select to apply rule-based actions 30 (e.g., A1, A2), according to the membership of discovered document 10C in these groups.

For example, network entity 40 may be a host computer 40 that may belong to an analyst or administrative user and may be associated with or communicatively connected to system 100. Auditing module 300 may generate one or more warning notifications (e.g., send one or more email message) to the local host computer regarding discovery and/or retrieval of a copy of marked document 10B at an unauthorized location.

In another example, network entity 40 may include one or more modules that may be adapted to manage data transfer over a communication network (e.g., a firewall module, a switch module, a router module and the like). The one or more modules may be implemented as software modules, hardware modules or any combination thereof, as known in the art. The rule-based action may include a restriction of data transfer between network entity and the discovered location (e.g., a domain associated with a domain name of an online host 60A). Auditing module 300 may apply the selected action on network entity 40 (e.g., a firewall module) by configuring network entity 40 according to the selected action (e.g., configuring the firewall module to restrict and/or prevent upload of data to online host 60A).

As explained herein, a naive search (e.g., by a search engine) for documents belonging or pertaining to a specific entity or organization (e.g., documents belonging to a research and development company) as performed in the state of the art may include simply searching the internet for the organization's name as a search term, and may yield an overwhelming amount of documents, which may not be feasible to manually analyze.

Embodiments of the invention may limit a number of search results provided by a search engine. This limitation may include for example marking a group of N1 documents having at least one common document property (e.g., top-secret documents of a specific department in the organization) by an encoding function (e.g., 20A-2), such that a search result that may be conducted by a search engine (e.g., 61), may including an integer number N2 of discovered documents 10C, and N2 may be substantially limited by the number of copies of documents of the group of N1 documents on the computer network (e.g., at most in the same order of magnitude as the number of searched documents N1).

For example, search term generator 310 may receive (e.g., from an organizational database, such as element 20A) one or more basic markers 20A-1 and an encoding function 20-A2 (such as the examples of Tables 2 and 3), associated with the common document property. The received encoding function 20-A2 may be adapted to produce encoded markers that may uniquely represent the at least one common document property of the N1 documents, based on the one or more basic markers.

Encoded marker 70B may uniquely represent one or more document property in a sense that the probability of discovering (e.g., on the internet, by utilizing a search engine) the encoded markers in the context of the searched N1 documents on the computer network may be substantially higher than the probability of discovering the encoded markers in a context that excludes the searched N1 documents.

Search term generator 310 may generate an encoded marker according to the encoding function, based on the one or more basic markers and provide the encoded marker to a search engine 61 as a search term 310A. Auditing module 300 may obtain a number N2 of search results from search engine 61, where at least one search result may include one or more relevant references to locations of discovered documents 10C, that are copies of marked documents 10B on the computer network 60.

As the encoded markers uniquely represent the N1 documents having the common document property, N2 may be substantially limited by the number of copies of documents of the group of N1 documents on the computer network.

Furthermore, as such copying or leaking of documents is typically performed manually per document, it may be assumed that the number N2 of relevant, discovered leaked documents may be at most of the same order of magnitude as N1, and in any case much smaller than the multitude of irrelevant search results that may be provided by the naive state-of-the-art method described herein.

As explained herein, search engine 61 may limit the number of reported results in response to search requests. For example, a search that may be conducted by search engine 61 may yield 50000 results, but (as typically is the case in commercially available search engines) search engine 61 may only report the first 1000 results to system 100.

According to some embodiments of the invention, auditing module 300 may be configured to overcome this limitation by splitting the search to two or more separate searches, that may each yield a smaller (e.g., below the report limit) number of search results.

For example, search term generator 310 of auditing module 300 may produce a plurality of search terms 310A, where each search terms 310A includes at least one encoded marker 70B and at last one splitting parameter. Auditing module 300 may utilize search engine 61 to conduct a search of computer network 60 based on the plurality of search terms 310A, to split the search result as explained.

The at least one splitting parameter may relate to one or more properties of the discovered document, including for example: a time and/or date of associated with the document (e.g., before a first time of storage, between the first time and a second time, after the second time, etc.); a size (e.g., in storage Bytes) of the discovered document (e.g., below a first size, between the first size and a second size, above the second size, etc.); including and excluding a specific word (e.g., a word in a title of a document, in a metadata associated with the document, in a content of the document, etc.).

In some embodiments, splitting may be performed two or more times (e.g., iteratively, recursively, and the like), until auditing module 300 may receive from search engine 61 all the yielded results of the search. Each iteration or repetition may utilize a different value of a splitting parameter.

Pertaining to the same example, auditing module 300 may repeat the search at least 50 times, to receive from search engine 61 all 50000 yielded search results, 1000 results at a time. Auditing module 300 may, for example, conduct each search using a different search term that may include a different value of a size parameter per each search (e.g., require the search engine to conduct a first search for documents that have a size that is within a first interval, a second search for documents that have a size that is within a second interval, and so on).

Figure 5:
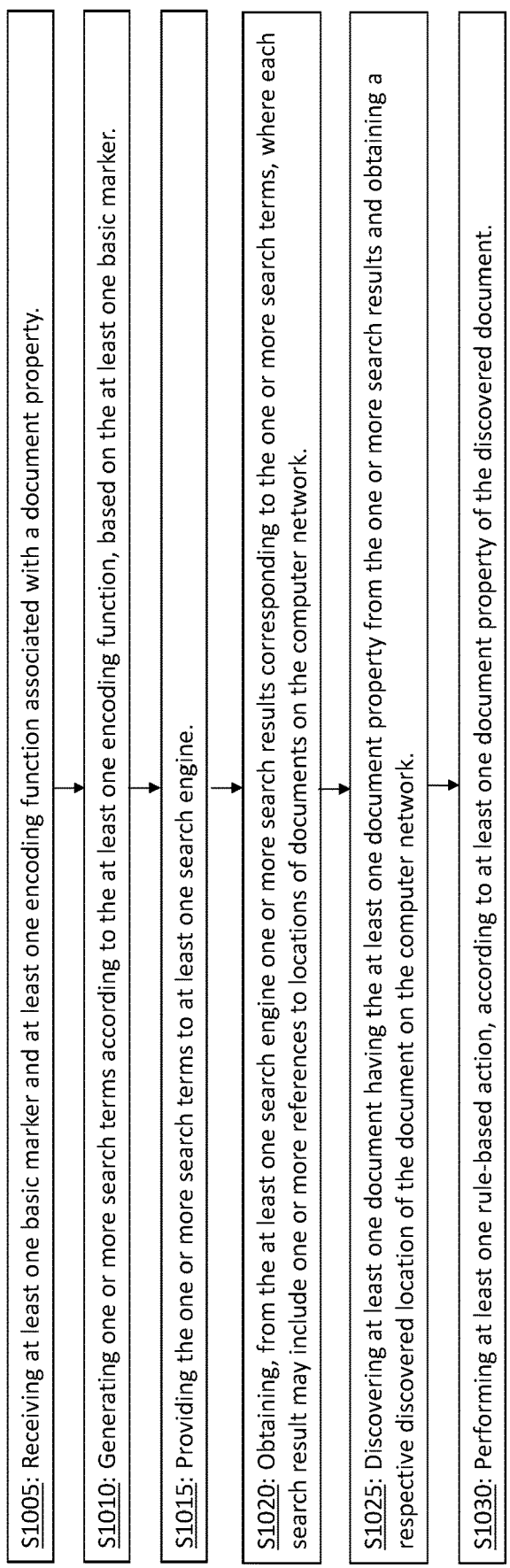
FIG. 5 is a flow diagram, depicting a method for detecting leaked documents on a computer network according to some embodiments.

Reference is now made to FIG. 5, which depicts a method for detecting a location of storage of leaked documents on a computer network (e.g., element 60 of FIG. 4), according to some embodiments of the invention.

As shown in step 1005, the method may include receiving, by at least one processor (e.g., element 2 of FIG. 1) of a computing device (e.g., element 1 of FIG. 1) at least one basic marker (e.g., element 70A of FIG. 2) and at least one encoding function (e.g., element 20A-2) associated with at least one document property or combination thereof (e.g., as elaborated above in Table 1).

In some embodiments, the basic marker 70A may be any type of a searchable data element (e.g., by a commercially available search engine, such as element 61 of FIG. 4), including for example a character string, an image, and the like.

As shown in step 1010, at least one processor 2 may generate one or more search terms (e.g., element 310A of FIG. 4) according to the at least one encoding function and based on the at least one basic marker 70A.

As shown in steps 1015, at least one processor 2 may provide the one or more search terms to at least one search engine (e.g., element 61 of FIG. 4).

As shown in steps 1020, at least one processor 2 may obtain from the at least one search engine one or more search results corresponding to the one or more search terms. Each search result may include one or more references (e.g., a domain name, a host name, a pointer, a link, an IP address, etc.) to locations of documents (e.g., location of storage of documents) on the computer network (e.g., on one or more computing device that may be included in the computer network, such as a database, a server, a host computer and the like).

As shown in step 1025, at least one processor 2 may discover at least one document having the at least one document property from the one or more search results and may obtain a respective discovered location (e.g., an IP address) of the storage of a document on the computer network.

As shown in step 1030, at least one processor 2 may perform at least one rule-based action, according to at least one document property of the discovered document. For example, the at least one processor 2 may produce at least one warning notification (e.g., an email message) to a predefined responsible person, according to the pertinence of the discovered document to a work group, the document's level of secrecy, etc. Additionally, or alternately, the at least one processor 2 may perform at least one rule-based action according to the location at which the document was found. Pertaining to the same example, the at least one processor 2 may produce the warning email message if the document was discovered at a first location (e.g., on a domain associated with a domain name of a competing organization), but refrain from producing a warning message if the document was discovered in a permitted location (e.g., a domain associated with a domain name of a commercial partner).

Embodiments of the present invention may provide an improvement over the state of the art in the field of document management technology, search technology, storage technology and security technology. Embodiments may facilitate a complete, exhaustive way to utilize a search engine (e.g., a commercially available search engine) to search for proprietary (e.g., belonging to an individual or an organization) documents over a computer network (e.g., the internet), or across different databases, websites or domains, according to specific document properties (e.g., pertinence to a specific subject, person, project, etc.).

Embodiments may further ascertain whether such a document has been leaked (e.g., copied maliciously or inadvertently) to a location on the computer network, or outside a specific domain or database, and select and perform at least one action, based on the document's properties and the discovered location.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. Further, features or elements of different embodiments may be used with or combined with other embodiments.

The invention claimed is:

1. A method for detecting leaked documents, the method comprising:
using at least one processor to perform:
generating one or more search terms using at least one basic marker and at least one encoding function associated with at least one document property of a document;
providing the one or more search terms to at least one search engine and obtaining therefrom one or more search results corresponding to the one or more search terms, wherein the one or more search results include one or more references to locations of documents on a computer network;
identifying, from among the one or more search results and using at least one decoding function associated with the at least one encoding function, at least one document having the at least one document property and a respective at least one identified location on the computer network;
classifying the at least one identified document, based on the at least one identified location, content, and/or property of the at least one identified document, to obtain a respective at least one classification of the at least one identified document;
selecting at least one action according to the at least one classification of the at least one identified document; and
applying the at least one action on a network entity, wherein the at least one action comprises generating a notification message to the network entity and/or configuring the network entity to restrict transfer of data between the network entity and the at least one identified location.

2. The method of claim 1, wherein the encoding function comprises at least one obfuscation element.

3. The method of claim 1, wherein the at least one basic marker comprises a character string.

4. The method of claim 1, wherein the at least one basic marker comprises an image data element.

5. The method of claim 1, wherein the at least one document property comprises a property selected from the group consisting of: a subject of the document, a title of the document, an owner of the document, a pertinence of the document, and a level of secrecy associated with the document.

6. The method of claim 1, wherein the identifying comprises:
retrieving one or more documents according to the at least one identified location, and
applying the at least one decoding function to the one or more retrieved documents to identify the at least one document having the at least one document property.

7. The method of claim 1, wherein the classifying comprises:
classifying, using a machine-learning (ML) based classifier model, the at least one identified document based on the at least one identified location of the at least one identified document on the computer network.

8. The method of claim 1, wherein the classifying comprises:
classifying, using a natural language processing (NLP) model, the at least one identified document based on the content of the at least one identified document.

9. A system for detecting leaked documents, the system comprising:
a non-transitory memory storing executable code; and
at least one processor that, upon executing the executable code, performs a method comprising:
generating one or more search terms using at least one basic marker and at least one encoding function associated with at least one document property of a document;
providing the one or more search terms to at least one search engine and obtaining therefrom one or more search results corresponding to the one or more search terms, wherein the one or more search results include one or more references to locations of documents on a computer network;
identifying, from among the one or more search results and using at least one decoding function corresponding to the at least one encoding function, at least one document having the at least one document property and a respective at least one identified location on the computer network;
classifying the at least one identified document, based on the at least one identified location, content, and/or property of the at least one identified document, to obtain a respective at least one classification of the at least one identified document;

selecting at least one action according to the at least one classification of the at least one identified document; and applying the at least one action on a network entity, wherein the at least one action comprises generating a notification message to the network entity and/or configuring the network entity to restrict transfer of data between the network entity and the at least one identified location.

10. At least one non-transitory memory storing executable code that, when executed by at least one processor, causes the at least one processor to perform a method for detecting leaked documents, the method comprising:

generating one or more search terms using at least one basic marker and at least one encoding function associated with at least one document property of a document;

providing the one or more search terms to at least one search engine and obtaining therefrom one or more search results corresponding to the one or more search terms, wherein the one or more search results include one or more references to locations of documents on a computer network;

identifying, from among the one or more search results and using at least one decoding function corresponding to the at least one encoding function, at least one document having the at least one document property and a respective at least one identified location on the computer network;

classifying the at least one identified document, based on the at least one identified location, content, and/or property of the at least one identified document, to obtain a respective at least one classification of the at least one identified document;

selecting at least one action according to the at least one classification of the at least one identified document; and applying the at least one action on a network entity, wherein the at least one action comprises generating a notification message to the network entity and/or configuring the network entity to restrict transfer of data between the network entity and the at least one identified location.

11. A method for detecting leaked documents, the method comprising using at least one processor to perform:

generating one or more search terms using at least one basic marker and at least one encoding function associated with at least one document property of a document, wherein the encoding function comprises at least one obfuscation element;

providing the one or more search terms to at least one search engine and obtaining therefrom one or more search results corresponding to the one or more search terms, wherein the one or more search results include one or more references to locations of documents on a computer network;

identifying, from among the one or more search results, at least one document having the at least one document property and a respective at least one identified location on the computer network, the identifying comprising:

retrieving one or more documents according to their respective locations given in the one or more search results, and applying a decoding function to the one or more retrieved documents to identify the at least one document having the at least one document property; and performing at least one action according to the at least one document property of the at least one identified document, wherein the at least one action is selected from the group of actions consisting of:

sending a request message to one or more online host devices associated with the at least one identified location;

sending a warning notification to one or more local host devices;

marking the at least one identified document as compromised on a local document repository; and storing the at least one identified location on the local document repository.

12. The method of claim 11, wherein the at least one basic marker comprises a character string.

13. The method of claim 11, wherein the at least one basic marker comprises an image data element.

14. The method of claim 11, wherein the at least one document property comprises a property selected from the group consisting of: a subject of the document, a title of the document, an owner of the document, a pertinence of the document, and a level of secrecy associated with the document.

15. A system for detecting leaked documents, the system comprising:

a non-transitory memory storing executable code; and at least one processor that, upon executing the executable code, performs a method comprising:

generating one or more search terms using at least one basic marker and at least one encoding function associated with at least one document property of a document, wherein the encoding function comprises at least one obfuscation element;

providing the one or more search terms to at least one search engine and obtaining therefrom one or more search results corresponding to the one or more search terms, wherein the one or more search results include one or more references to locations of documents on a computer network;

identifying, from among the one or more search results, at least one document having the at least one document property and a respective at least one identified location on the computer network, the identifying comprising:

retrieving one or more documents according to their respective locations given in the one or more search results, and applying a decoding function to the one or more retrieved documents to identify the at least one document having the at least one document property; and performing at least one action according to the at least one document property of the at least one identified document, wherein the at least one action is selected from the group of actions consisting of:

sending a request message to one or more online host devices associated with the at least one identified location;

sending a warning notification to one or more local host devices;

marking the at least one identified document as compromised on a local document repository; and storing the at least one identified location on the local document repository.

16. The system of claim 15, wherein the at least one basic marker comprises a character string.

17. The system of claim 15, wherein the at least one basic marker comprises an image data element.

18. The system of claim 15, wherein the at least one document property comprises a property selected from the group consisting of: a subject of the document, a title of the document, an owner of the document, a pertinence of the document, and a level of secrecy associated with the document.

19. At least one non-transitory memory storing executable code that, when executed by at least one processor, causes the at least one processor to perform a method comprising:

generating one or more search terms using at least one basic marker and at least one encoding function associated with at least one document property of a document, wherein the encoding function comprises at least one obfuscation element;

providing the one or more search terms to at least one search engine and obtaining therefrom one or more search results corresponding to the one or more search terms, wherein the one or more search results include one or more references to locations of documents on a computer network;

identifying, from among the one or more search results, at least one document having the at least one document property and a respective at least one identified location on the computer network, the identifying comprising:

retrieving one or more documents according to their respective locations given in the one or more search results, and applying a decoding function to the one or more retrieved documents to identify the at least one document having the at least one document property; and performing at least one action according to the at least one document property of the at least one identified document, wherein the at least one action is selected from the group of actions consisting of:

sending a request message to one or more online host devices associated with the at least one identified location;

sending a warning notification to one or more local host devices;

marking the at least one identified document as compromised on a local document repository; and storing the at least one identified location on the local document repository.

20. The at least one non-transitory memory of claim 19, wherein the at least one basic marker comprises a character string or an image data element.

21. The at least one non-transitory memory of claim 19, wherein the at least one document property comprises a property selected from the group consisting of: a subject of the document, a title of the document, an owner of the document, a pertinence of the document, and a level of secrecy associated with the document.

* * * * *